Jan. 30, 1968  L. A. KOLZE ET AL  3,366,760
PRESSURE SWITCH ASSEMBLY
Filed Feb. 23, 1966  3 Sheets-Sheet 3
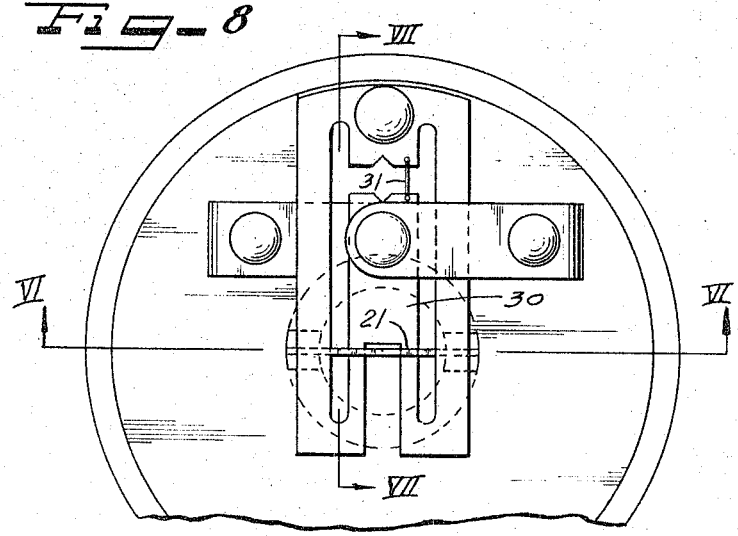
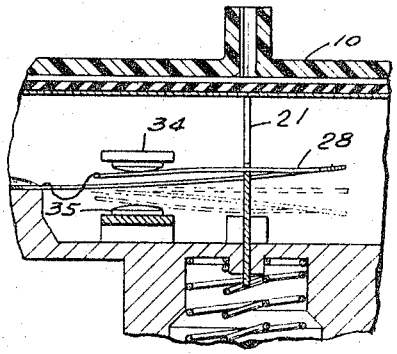
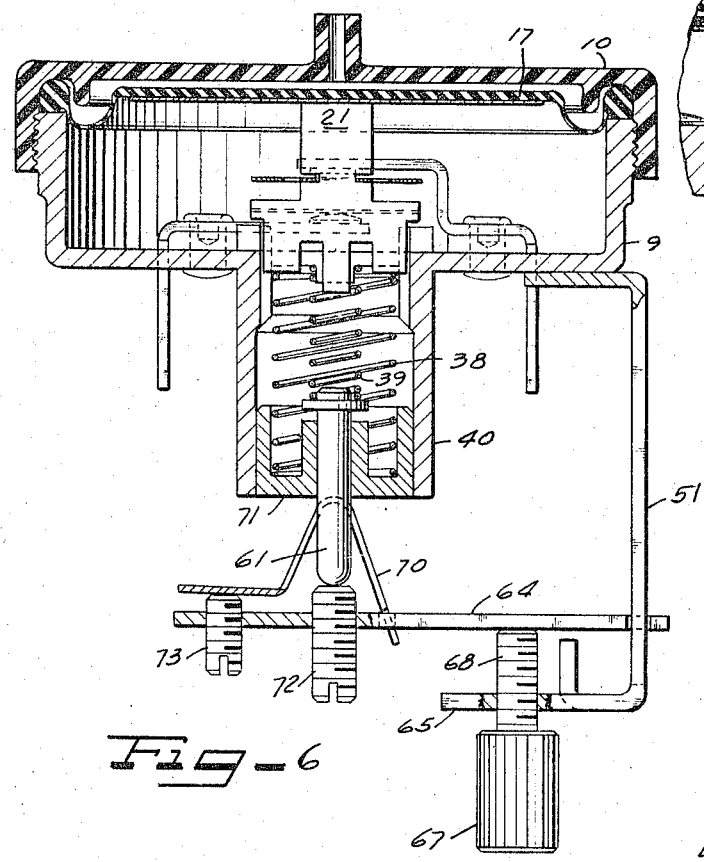
INVENTOR.
LAWRENCE A. KOLZE
PAUL W. SCHAFF
BY Hill, Sherman, Meroni, Gross & Simpson
ATTORNEYS

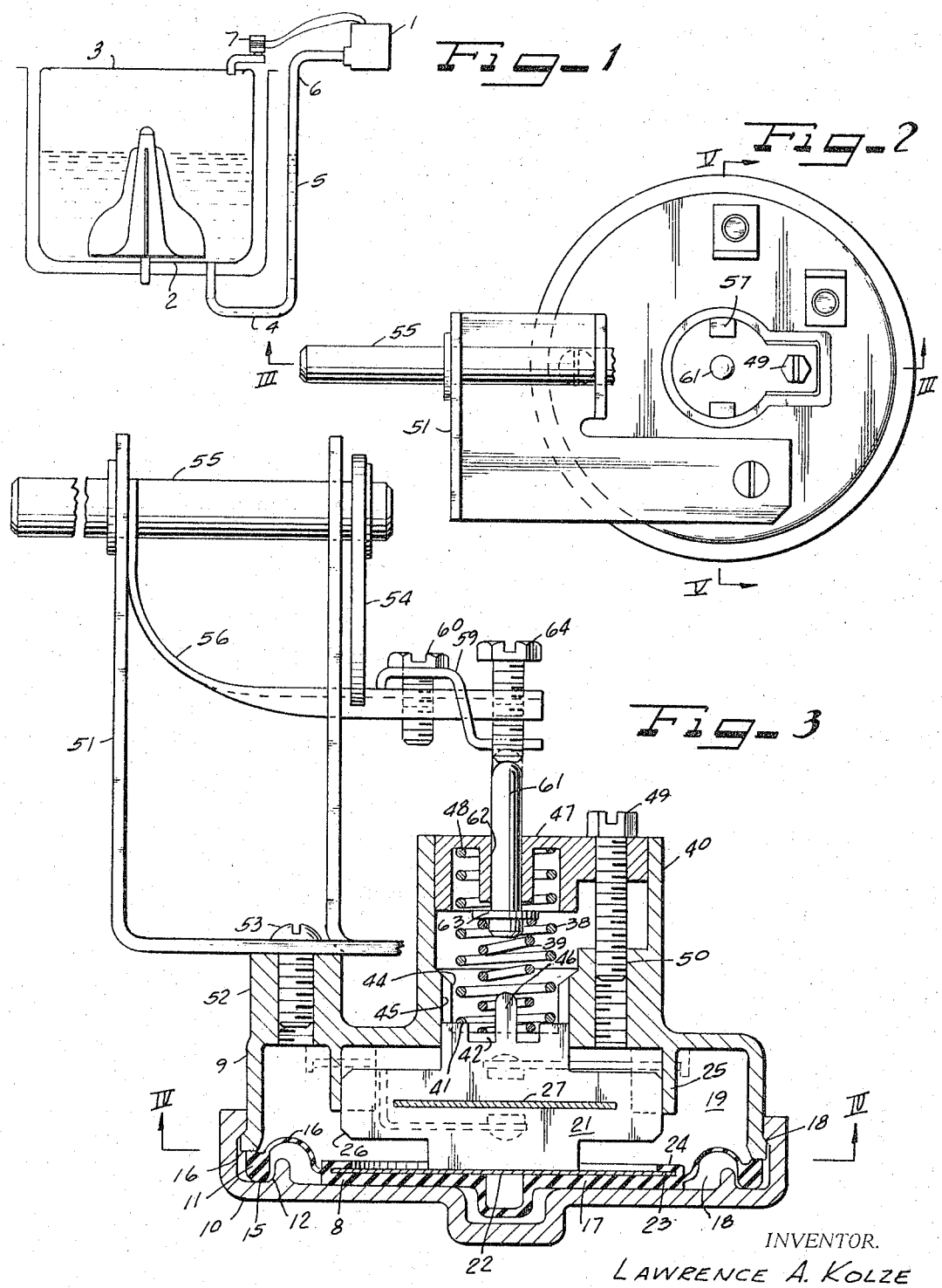

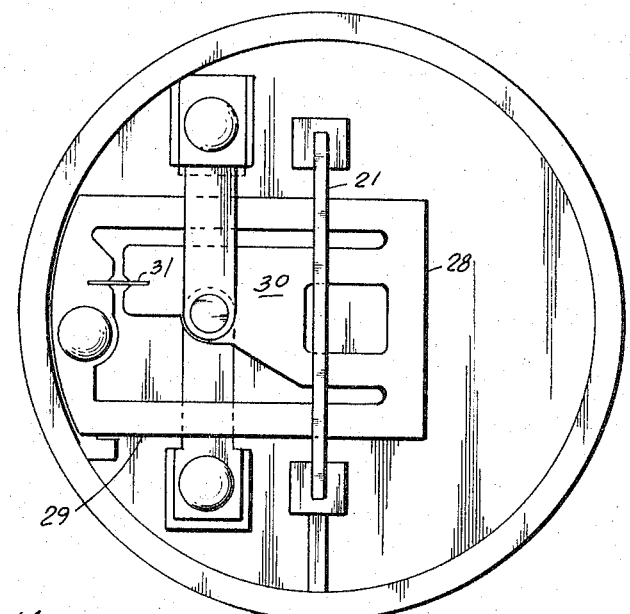
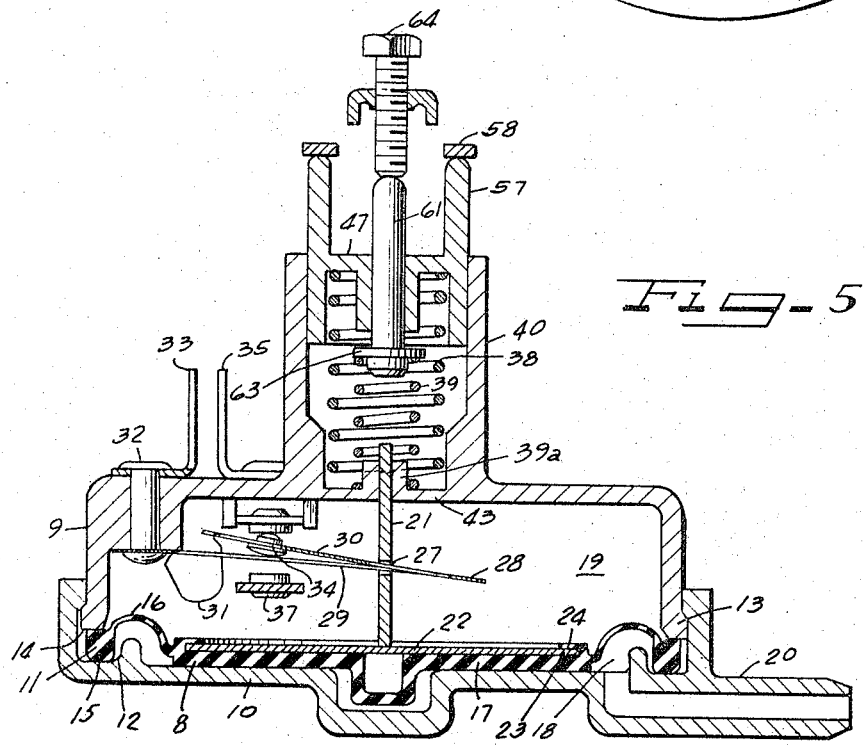

United States Patent Office

3,366,760
Patented Jan. 30, 1968

---

3,366,760
PRESSURE SWITCH ASSEMBLY
Lawrence A. Kolze, Bensenville, and Paul W. Schaff, Arlington Heights, Ill., assignors to The Dole Valve Company, Morton Grove, Ill., a corporation of Illinois
Filed Feb. 23, 1966, Ser. No. 529,442
6 Claims. (Cl. 200—83)

ABSTRACT OF THE DISCLOSURE

A pressure actuated switch including a hollow switch body having a pressure sensitive actuator and having a motion translation member movable by movement of the actuator for operating a snap acting electrical switch. The motion translation member has a pair of biasing means urging the translation member and hence the switch against positive pressure applied to actuate the pressure sensitive actuator. Individual adjustment means are provided for regulating the bias of each of the biasing means both independently and jointly thereby affording the snap acting switch the flexibility of constant reset, constant differential reset, and proportional reset.

---

This invention relates to a pressure switch assembly and in particular to a switch assembly for actuating a control function in response to selectable, as well as fixed, pressure differentials.

Pneumatically operated switches have become increasingly important for actuating various cycles of household appliances and especially for controlling the level of water within laundry machines. In particular, the water head developed in a laundry machine can be used as a variable pressure source in conjunction with such switches for regulating the quantity of water received therein. This is accomplished by arranging a resilient diaphragm to be movably sensitive to a changing water head for operating solenoid type water valves.

The level of water within a machine must be controlled at two points, the point at which the water is cycled off after filling the machine and the point at which the water is cycled on after the level of water has receded below a desirable level. This invention has as a principal object a pressure operated switch which incorporates a means for varying both points independently of each other and which also provides a means for varying both points in a dependent manner.

It is also an object of this invention to provide a pressure operated switch which may be utilized for a machine having either a constant level reset, a constant differential reset or a proportional reset requirement.

It is a further object of this invention to provide a pressure operated switch assembly having a reduced cost and an increased adaptability to the functional requirements of varying systems.

It is another object of this invention to provide a pressure operated switch having a motion translation member for actuating a snap switch blade wherein the translation member is sequentially acted upon by a trip spring and a reset spring respectively in response to increasing actuating pressures.

These and other objects, features and advantages of the present invention will be understood in greater detail from the following description and the associated drawings wherein reference numerals are utilized in designating preferred embodiments and wherein:

FIGURE 1 is a schematic diagram of the pressure switch assembly according to this invention as operably disposed in a working environment;

FIGURE 2 is a top view of the pressure switch assembly of this invention having a portion cut away for disclosing the surface features thereof;

FIGURE 3 is a cross-sectional view of the pressure switch assembly as taken along the lines III—III of FIGURE 2 showing a portion thereof in elevation;

FIGURE 4 is a cross-sectional view taken along the lines IV—IV of FIGURE 3 for showing internal structure thereof;

FIGURE 5 is a cross-sectional view taken along the lines V—V of FIGURE 2 showing a side view of the features shown in FIGURE 3;

FIGURE 6 shows a cross-sectional view of an alternate form of the pressure switch of this invention;

FIGURE 7 shows a partial sectional view of the alternate form of this invention taken at right angles to the view of FIGURE 6; and FIGURE 8 shows a top view of the assembly of FIGURE 6 with the housing 10 and diaphragm 17 removed.

The preferred embodiment of this invention, as set forth in the above-mentioned figures, contemplates a pneumatically operated diaphragm for actuating a snap acting electrical switch. If, then, this device is to be employed for controlling the water level of a laundry machine, the air pressure received at this diaphragm must be developed as a function of the water level to be controlled. A typical connection for this purpose is shown in FIGURE 1 where a pressure switch assembly 1 is connected to the base 2 of a washing tub 3 through a U-shaped conduit 4.

It can be appreciated, therefore, that as the water level within the tub 3 rises, the air trapped in the upper portion 6 of the tube 4 will be correspondingly compressed resulting in an increased pressure delivered to the switch assembly 1. In this way, then, the pressure switch 1 is suitably connected for sensing the level within the tub 3 and for making the appropriate control response.

For the case of a water level control as illustrated in FIGURE 1, the appropriate response would be to de-activate the solenoid operated water valves 7 when the water within the tub 3 reaches a pre-chosen level. It is understood, of course, that the water valves 7 may be turned on initially simply by throwing a main switch for beginning machine operations.

With the environmental considerations of FIGURE 1 as a background, an understanding of the pressure operated mechanism itself can best be accomplished by reference to FIGURES 3 and 5 jointly. Also, the drawing of FIGURE 2 may be used as an illustration of the overall configuration of the external parts to be described below.

In the device as shown in FIGURES 3 and 5, there are four principal regions of focus:

First, a pneumatic chamber has a resilient diaphragm disposed for being operated by the air pressure as developed in the system of FIGURE 1.

Second, a translation chamber is disposed adjacent to the pneumatic chamber and comprises generally a motion translation member operated by the resilient diaphragm and a snap acting switch carried by the motion translation member for engaging and disengaging an electrical contact.

Third, a biasing chamber is provided consecutively of the first two mentioned chambers and involves the use of first and second coil springs for urging the motion translation member and, hence, the resilient diaphragm in a direction for opposing increases in pressure within the pneumatic chamber.

Fourth, a level selector is mounted at the switch housing for engaging the biasing springs in such a manner as to increase or decrease the spring tension by a simple manual adjustment. Altering this spring tension, of course, will then change the air pressure required to move the resilient diaphragm for making the appropriate electrical contacts.

Referring to the figures in more detail, it can be understood that the resilient diaphragm 8 which is the power member of the system is disposed to be removably secured between the principal switch housing 9 and a lower snap-fitted cover 10. To accomplish this, the diaphragm 8 has an annular rim 11 received within a complementary groove 12 formed on the inner surface of the cover 10. The cover 10 is then snapped into position at cooperably fitted surfaces shown at 13 for compressing the annular rim 11 between the end face 14 of the housing 9 and the base 15 of the groove 12. The annular rim 11 is integrally connected by means of an intermediately positioned flexible web 16 to a reinforced center 17 of the diaphragm 8. The web 16 is curved in a radial cross-section to allow the diaphragm to move upwardly of its seated position in an unrestrained manner.

By this connection, then, the resilient diaphragm 8 divides the enclosure formed by the housing 9 and the lower cover 10 into a lower or pneumatic chamber 18 and an upper or translation chamber 19. Since these drawings illustrate the condition of zero gauge pressure, the pneumatic chamber 18 is shown in a degenerate state with the diaphragm 17 seated on the inner surface of the cover 10. However, as shown in FIGURE 5, the cover 10 is provided with an inlet nipple 20 for connection to the variable pressure source indicated by the system of FIGURE 1. As the pressure received at the inlet 20 increases above that of the atmosphere, the diaphragm 8 will be caused to move upwardly and the pneumatic chamber 18 will be enlaged accordingly.

The translation chamber 19 has a motion translation member 21 disposed for performing the principal work function of this device. The motion translation member 21 is connected to the resilient diaphragm 8 at a backing plate 22 which is snap fitted or molded within a groove 23 defined by an overlying lip 24 of the diaphragm 8.

The translation chamber 19 is provided with depending guide members 25 which are disposed to be cooperable with tabs 26 extending outwardly of the motion translation member 21.

From a joint consideration of FIGURES 3 and 5, it can be seen that the motion translation member 21 takes the form of a relatively thin plate having an elongated slot 27 disposed centrally thereof for being substantially perpendicular to the direction of intended motion.

Referring to FIGURE 5, it can be seen that the slot 27 is the carriage means for the switch 28. The precise configuration of the switch 28 can best be seen from the sectioned view of FIGURE 4. This switch is of the snap acting variety and its operation is well understood by those versed in the art. Principally, however, the switch 28 comprises a snap lever 29 and a snap blade 30. The free end of the blade 30 is connected to the lever 29 by an overcenter spring 31. While the cantilever end of the switch 28 is carried within the slot 27 by the motion translation member 21, the outermost end of the snap lever 29 is securely mounted to the housing 9 by the use of a rivet 32 which is provided with an external connector 33 for energizing the snap switch 28.

The electrical contacts associated with the switch 28 comprise an elevated head 34 disposed at the outer free end of the snap blade 30 and two stationary seats 35 and 37. The seat 35 is secured at the upper surface of the housing 9 for joining a second external connector 36, while the seat 37 is connected to a third electrically external connector.

In the position shown in FIGURE 5, it can be observed that a completed circuit is formed between the electrical fixtures 33 and 36 through the contacts 34 and 35. To break this internal circuit and thereby deactuate the solenoid valves 7, the head 34 must be snapped from the contact 35 to the seat 37. This is accomplished by driving the motion translation member 21 upwardly within the translation chamber 19. In its upward motion the lower surface of the slot 27 will contact the lower surface of the snap lever 29 and carry the switch 28 upward until the plane of the snap blade 30 is substantially coincident with the plane of the snap lever 29. At this critical position, the switch will trip as the over-center spring 31 will cause the blade 30 to snap downward for bringing the head 34 into contact with the seat 37. Decreasing the pressure within the pneumatic chamber 18, corresponding to a decline in water level within the tub 3, will then reverse this procedure causing the head 34 to reengage the contact 35 for turning on the water valves 7. This is known as the reset action.

The precise amount of pressure that will cause the diaphragm 8 to begin its upward movement for performing the appropriate control function will be determined by the bias that is applied downwardly on the motion translation member 21. Here, this bias is accomplished by the use of two concentrically disposed coil springs 38 and 39 disposed within a control housing 40 formed integrally with the switch housing 9.

In FIGURE 3, the springs 38 and 39 will contact the motion translation member 21 at different time intervals in its upward motion. This is so because the motion translation member has first and second elevations 41 and 42 preferably formed at the upper edge thereof for engaging the individual springs. These two elevations protrude through a slot 45 formed within a cross member 43 separating the translation chamber 19 from the interior of the control housing 40.

The upper elevation 41 of this translation member extends above the member 43 even when the pneumatic chamber 18 is exhausted and the diaphragm 8 is seated against the lower cover 10. However, the lower elevation 42 extends below the upper surface of the member 43 when the diaphragm 8 is in a seated position and, therefore, will not contact the associated spring 39 until upward movement of the translation member 21 has correspondingly progressed. This provision for separate elevations allows the diaphragm 8 to be unseated from the cover 10 before engaging the additional spring 39.

A guide means is provided for the spring 38 in the form of a bore 44 within the lower portion of the control housing 40. Also, the slot 45 is extended upward for guiding the translation member 21 relative to the spring 38. While the outer spring 38 is guided by the bore 44, the inner spring 39 is guided by a boss 39a disposed centrally of the motion translation member 21 and extending within the inner spring 39.

In operation, upward movement of the member 21 caused by intial increase in pressure within the chamber 18 will be against the biasing force of both the springs 38 and 39. The snap blade 30 is designed to be actuated by the slot 27 after the edge 42 of the member 21 contacts the inner spring 39. Therefore, the point at which the water faucets 7 are cycled off will be determined by the combined loading of the springs 38 and 39.

After both springs are compressed which is a necessary trip condition, a decline in the water level will reduce the pressure within the chamber 18 and cause the member 21 to move in a direction for collapsing the diaphragm 8. During the downward motion of the member 21, the snap blade 30 will not reset until after the inner spring 39 has been reseated on the cross member 43. Therefore, the reset point is determined solely by the outer spring 38. This means that the trip and reset points can be varied independently by varying the spring rate of the springs 38 and 39.

As has been explained, by changing the biasing force exerted on the motion translation member 21, the pressure which will cause an upward movement of the diaphragm 8 is changed accordingly, and, since a change in pressure means an associated change in water level, a means for altering the bias is equivalent to a level selection control.

In this particular switch the bias provided by the spring 38 is varied by the use of a slidable plunger 47 received upwardly within the control housing 40. The outer spring 38 has its upper end received within a complementary groove 48 formed within the housing 47. Therefore, by sliding the plunger 47 within the control housing 40, the biasing force provided by the spring 38 can be altered.

One means for setting the bias of the spring 38 is to adjust a screw 49 received within the plunger 47 and threaded into the control housing 40 at the bore 50. By turning this screw the plunger 47 is moved inwardly or outwardly and the bias of the spring 38 is correspondingly varied.

An alternate and more accessible means, however, for changing the bias on the spring 38 is provided in the form of a level selector mounted externally of the switch assembly. In connection with the following discussion on the operation of this level selector, the function of the inner spring 39 and the means for altering its bias will also be understood.

The level selector as shown in FIGURE 3, comprises generally a supporting bracket 51 mounted at the switch housing 9 on an upwardly extending boss 52 and secured by a threaded bolt 53. The principal focus of this level selector is on an eccentric cam 54 carried by a shaft 55 on sleeve bearings formed within the supporting bracket 51. A depending and flexible arm 56 extends from the shaft 55 to a position above and central to the control housing 40.

In connection with the use of this level selector, it can be seen in FIGURE 5 that the plunger 47 has oppositely disposed upwardly extending stems 57 for receiving feet 58 of a bifurcated bracket 59 mounted adjacent to the cam 54 by a screw 60. It can be observed, therefore, that by rotating the eccentric cam 54, the plunger 47 can be caused to move inwardly or outwardly for altering the tension on the spring 38.

The spring 38 provides the principal downward bias to the motion translation member 21, and, as has been discussed, this device incorporates alternate means for varying this spring tension. However, the inner spring 39 also biases the motion translation member 21 downward and, accordingly, means is also provided to alter this spring tension. In FIGURE 3, it can be seen that this means takes the form of a piston 61 disposed within a sleeve 62 formed centrally of the plunger 47. The piston 61 has a flange 63 extending outwardly of the inner end thereof for receiving the upper extremity of the spring 39. It should be noted that the flange 63 is recessed of the end of the shaft 61 so that the protruding tip may be used as an upper guide for the spring 39. The protruding tip also serves to contact the finger 46 so that when the level selector cam is rotated beyond the highest trip setting the switch can be manually reset regardless of the counteracting pressure applied by the diaphragm. The tension and, hence, the biasing force provided by the spring 39 is altered by sliding the piston 61 inwardly or outwardly of the sleeve 62. A particular setting may be chosen for the tension of the spring 39 by turning a screw 64 threaded within the outer end of the arm 56 and contacting the upper end of the piston 61.

It is apparent that changing the tension on the spring 39 will alter the level of water required to trip the snap blade 30. However, a constant reset level can be achieved by this device irregardless of the maximum level of water within the machine. This is accomplished by holding the plunger 47 fixed relative to the housing 9 by the positioning of the screw 49 within the bore 50. When this is done and the bracket 59 is removed from the level selector, the snap blade 30 will always reset for the same water level. The tension on the spring 39 may be altered by turning the selector shaft 55. But the turning of the shaft 55 will alter only the trip position or the maximum water level point, because when reset occurs, the spring 39 is seated at the cross member 43 and therefore does not influence the member 21.

If the reset or refill level is desired to change with the change in the trip or fill level, the spring 39 may be entirely removed along with the screw 49 and the bracket 59 may be used to actuate the plunger 47. Increasing the tension on the remaining spring 38 will increase the trip level and the reset level by equal amounts as the same spring controls both actions. This use of the device may be referred to a constant differential reset.

A third use of the device is proportional reset. At higher trip water levels it may be desirable to allow a sizable fall in the water level before reset occurs. And at lower trip water levels it may be desirable to allow only a slight fall in the water level before reset occurs. Proportional reset can be achieved by removing the screw 49 and by utilizing both the screw 64 and the bracket 59. If the combined spring loads are provided to have an appreciably greater loading rate than that of the single spring 38, a given inward movement of the plunger 47 and of the piston 61 will increase the trip loading point by a greater amount than the increased loading of the reset point. This means that the differential between the fill and refill levels will be greater for higher water levels and less for lower levels.

FIGURES 6, 7 and 8 disclose an alternate form of this invention and whereas many parts thereon are similar to the above-described assembly, the reference numerals associated with FIGURES 3, 4 and 5 have been applied here.

However, in FIGURE 6, it can be seen that the manual level control mechanism employs features distinct from those illustrated above. Here, it can be seen that the bracket 51 which is mounted on the switch housing 9, substantially as indicated in FIGURE 3, has a horizontal leg 65 for receiving a thumb screw 67 which in operation may be likened to the cam 54. Also, a lever 64 is pivotally mounted at the bracket 51 for having a function similar to that of the member 56 in that it provides the principal control motion for the device. This is accomplished by altering the setting of the screw 67 for swinging the lever 64 upwardly or downwardly about its pivotal mounting.

The motion of the lever 64 is then transmitted to the plunger 71 for changing the tension of the concentric springs 38 and 39. This is achieved by the use of a spring-like translation bracket 70 which has a first end locked within the lever 64 and a second end tensioned against an adjustment screw 73. Contact between the bracket 70 and the plunger 71 takes place at a rounded face which allows the pivotal motion of the lever 64 to be transformed into a translational motion of the plunger 71.

As in the case of the plunger 47 of FIGURE 3, motion of the plunger 71 of FIGURE 6 alters only the tension of the outside spring 38. To change the tension of the inside spring 39 means must be provided for adjusting the position of the piston 61. Here, this means takes the form of an additional adjustment screw 72 threadedly received within the lever 64.

It can be observed, therefore, that for a given setting of the screws 72 and 73, motion of the lever 64 will proportionally alter the tension of both springs 38 and 39. It is understood, of course, that the screws 72 and 73 may be individually adjusted to alter the relative tension as between the springs 38 and 39 for accommodating varying environmental requirements.

It will be understood that various modifications may be suggested by the embodiment disclosed but we desire to claim within the scope of the patent warranted hereon all such modifications as come within the scope of our invention.

What we claim is:
1. A pressure actuated switch comprising:
a hollow switch body having a pressure sensitive actuator extending across the interior thereof and di- viding said hollow switch body into a pneumatic and a translation chamber, said pneumatic chamber having an inlet leading thereinto and having means for connecting said inlet to a pressure source, a motion translation member mechanically coupled to said pressure sensitive actuator, a control housing secured to said switch body and having an opening communicating with said translation chamber, said motion translation member having a stem thereof protruding through said opening and extending within said control housing, first and second biasing means within said control housing contacting said stem and urging said stem and hence said pressure sensitive actuator in opposition to positive pressure applied to said pneumatic chamber, an over-center switch mechanically coupled to said motion translator member and being actuated by movement thereof in response to movement of said pressure sensitive actuator, first and second means for independently adjusting the biasing force of said first and second biasing means, respectively, and means for jointly adjusting the biasing force of said first and second biasing means.

2. A pressure actuated switch as described in claim 1 wherein said control housing is opened at the outermost end, a movable plunger adjustably positioned within said control housing at said opened end thereof and wherein said first biasing means is disposed intermediate said plunger and said stem for urging said pressure sensitive actuator in opposition to positive pressure applied to said pneumatic chamber.

3. A pressure actuated switch as described in claim 1 wherein said control housing is opened at the outermost end thereof, a movable plunger adjustably positioned within said control housing at said opened end, said plunger having a bore formed therein and a piston disposed axially within said bore and wherein said first biasing means is disposed intermediate said stem and said plunger and said second biasing means is disposed intermediate said stem and said piston.

4. A pressure actuated switch as described in claim 1 wherein said control housing is opened at the outermost end and has a cross member at the innermost end of said control housing, said cross member having said opening formed therein, said stem of said motion translation member having a first and second elevation thereof, a movable plunger adjustably positioned within said control housing at said opened end, said plunger having a bore formed therein and a piston disposed axially within said bore, and wherein said first biasing means is disposed intermediate said plunger and said first elevation and said second biasing means is disposed intermediate said piston and said second elevation.

5. A pressure actuated switch as described in claim 4 wherein said first elevation extends above the surface of said cross member defining the interior of said control housing, said second elevation extends below the surface of said cross member and wherein said first biasing means is disposed intermediate said plunger and said first elevation and said second biasing means is disposed intermediate said piston and said cross member.

6. A pressure actuated switch comprising:
a hollow switch body having a flexible diaphragm extending across the interior thereof and dividing said hollow switch body into a pneumatic and a translation chamber, said pneumatic chamber having an inlet leading thereinto and having means for connecting said inlet to a pressure source, a motion translation member mechanically coupled to said flexible diaphragm, a control housing secured to said switch body, said control housing being opened at the outermost end and having a port communicable with said translation chamber, said motion translation member having a stem extending through said port into said control housing, a movable plunger adjustably positioned within said control housing at said opened end thereof, said plunger having a bore formed therein and a piston disposed axially within said bore, a first biasing means disposed intermediate said plunger and said stem and a second biasing means disposed intermediate said piston and said stem, first and second adjustment means for independently positioning said plunger axially relative to said control housing, means operating jointly with said first adjustment means for proportionally positioning said piston axially relative to said control housing and means for adjusting the axial position of said piston relative to said bore.

References Cited
UNITED STATES PATENTS

| | | | |
|---|---|---|---|
| 2,636,093 | 4/1953 | Clarke et al. | 200—83 |
| 2,813,944 | 11/1957 | Tyzak | 200—83 |
| 2,825,780 | 3/1958 | Beller et al. | 200—83 |
| 3,114,813 | 12/1963 | Durst | 200—140 |
| 3,209,094 | 9/1965 | Bauer | 200—83 |

BERNARD A. GILHEANY, *Primary Examiner.*

H. B. GILSON, *Assistant Examiner.*